July 17, 1928.
E. F. W. ALEXANDERSON
1,677,699
SYSTEM OF ELECTRICAL DISTRIBUTION
Filed May 13, 1927
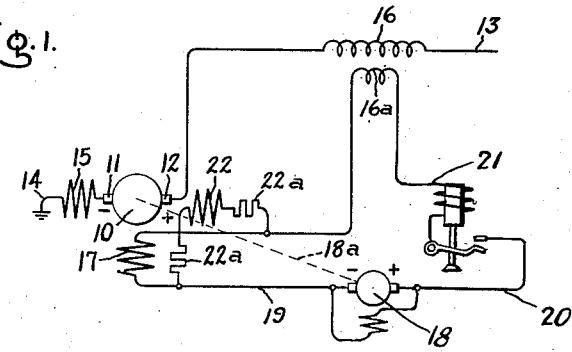
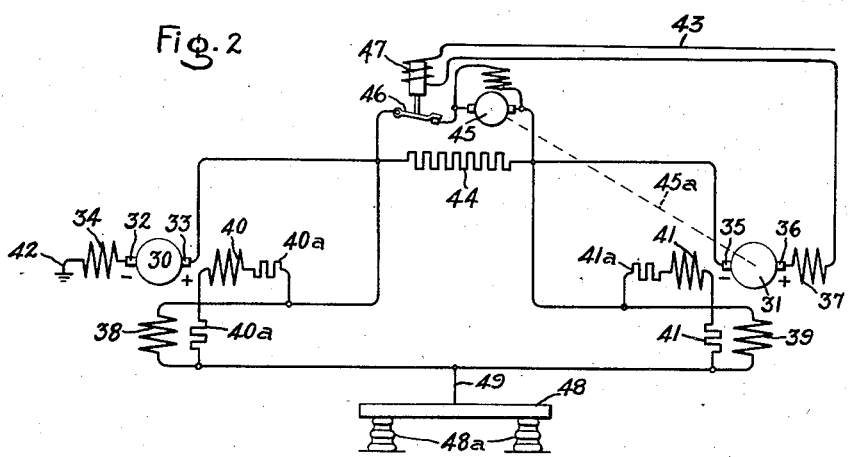
Inventor:
Ernst F. W. Alexanderson,
by
His Attorney.

Patented July 17, 1928.

1,677,699

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

Application filed May 13, 1927. Serial No. 191,252.

My invention relates to direct current systems of electrical distribution.

In direct current systems of distribution as heretofore constructed arrangements have been resorted to for protecting the machines in the system against overloads due to line short circuits with a view of avoiding the necessity of using line circuit breakers. These systems have generally included an arrangement for reducing the main field flux in response to the short circuit condition. Such systems as heretofore proposed have not effectively protected the machines against suddenly occurring line short circuits because they were slow in reducing the main field flux in response to the short circuit, and consequently the terminal voltage of the machines was not reduced quickly enough to prevent overloading the machines to some extent before a condition of equilibrium on short circuit was established. The systems heretofore proposed have also been subject to the disadvantage that the changes in the main field flux which they produced caused excessive sparking at the brushes of the dynamo-electric machines during the main field flux changes by inducing circulating currents in the armature winding elements that were short circuited by the brushes during commutation.

It is an object of my invention to construct a system having such electrical characteristics that in case of a line short circuit the resulting surge in line current will cause a very strong opposition to the usual flow of exciting field current in the dynamo-electric machines of the system. This strong opposition to the flow of exciting field current will quickly reduce the field flux of the machines and consequently their terminal voltage, thereby preventing overloading of the machines during the transient occurring immediately preceding the establishment of a condition of equilibrium on short circuit.

A further object of my invention is to prevent excessive sparking at the brushes of the dynamo-electric machines during the transient occurring in the initial period of the short circuit by producing a transient commutating flux which will induce in the armature conductors short circuited by the brushes during commutation a voltage opposing that induced therein at the same time by reducing the main field flux of the machines.

In this application I do not broadly claim a system of electrical distribution comprising of a dynamo-electric machine having an exciting field winding and means for opposing the flow of current in said exciting field winding for reducing the field flux in response to a short circuit on the system, such invention being broadly claimed in my pending application Serial No. 191,256, filed May 13, 1927, the invention in this application being for such a system in which the change in the field flux is utilized for producing a transient commutating flux and for the specific system disclosed herein.

The features of novelty of my invention are pointed out with particularity in the claims annexed to and forming part of this specification. For a more complete understanding of my invention, however, reference may be had to the following description taken in connection with the accompanying drawing, in which Fig. 1 is a diagrammatic view of a portion of a system of electrical distribution embodying my invention, and Fig. 2 is a modification of the system as illustrated in Fig. 1.

The embodiment of my improved system shown in Fig. 1 of the drawing includes a direct current dynamo-electric machine which may be used in the system as a generator or motor, but for convenience in describing the invention it will be considered as a generator. The armature 10 of the dynamo-electric machine, which is driven by any suitable means, is connected by circuits including commutator brushes 11 and 12 to the lines 13 and 14 respectively of the system. The circuit from the brush 11 to the line 14 includes a compensating or commutating field winding 15, and the circuit from the brush 12 to the line 13 includes an inductance 16. The field flux for the armature 10 is produced by an exciting field winding 17 which is energized during normal operation of the system by an exciter 18. The exciter 18 is driven from the shaft of the armature 10, as indicated by the dotted line at 18ª, but may be driven in any other convenient manner. The negative terminal of the exciter 18 is connected by conductor 19 to one side of the exciting field winding 17, and the positive terminal thereof is connected to the other side of the exciting field winding through conductor 20, under-current relay 21 and coil 16ᵃ which is in inductive relation to the inductance 16 forming part of the circuit from the armature 10 to the line 13. The coil 16ᵃ is placed in such inductive relation to the inductance 16 that in case of a surge in current from the armature 10 through inductance 16 to line 13, which would be occasioned for example by a line short circuit, that current will be induced in the coil 16ᵃ opposing the current flow from the exciter to the exciting field winding 17. This opposition to the current flow from the exciter 18 to the exciting field winding quickly reduces the field flux and also reduces the field current to such value that the under-current relay 21 will interrupt the circuit from the exciter to the exciting field winding. As the surge from the armature quickly reduces the field flux the terminal voltage of the machine is also quickly reduced and any damaging overload which might otherwise result from the surge or short circuit is prevented.

In dynamo-electric machines as ordinarily constructed, this rapid reduction in the field flux would cause serious commutating difficulties as it would induce circulating currents in the armature elements short circuited by the brushes during commutation thereby causing excessive sparking at the brushes which would damage the commutator. In accordance with my invention the excessive sparking induced by rapidly reducing the field flux is prevented by creating a transient commutating flux for inducing an electromotive force in the armature winding elements short circuited by the brushes during commutation opposing the electromotive force induced therein at the same time by the reduction of the field flux. The desired electromotive force for opposing the circulating current in these short circuited elements is induced by a flux opposing the usual commutating flux and transverse to the exciting field flux which will be apparent from the following considerations. It is well known that in a direct current generator the electromotive force induced in the armature coil elements will be such that the resulting current flow therein will produce a flux tending to resist a change in the total flux threading the coil elements. During the rotation of the armature in the exciting field flux, each coil element in turn changes its position so that the total flux threading it gradually increases to a maximum, and then is short circuited at the brush and commutated after which the total flux threading it gradually decreases. While the total flux threading a coil element is increasing the current flow therein is in such direction as to resist the flux changes and tends to decrease the total flux threading the coil element. On the other hand after a coil element is commutated and the flux threading it is decreasing the current induced therein resists the flux change and tends to increase the flux threading it.

A commutating field winding is generally employed adjacent the periphery of the armature where the coil elements are commutated which induces an electromotive force in each coil element in turn hastening the reversal of current therein. This electromotive force is such as to cause a current flow in the armature coil element in the same direction as the current flow therein after commutation and in view of the foregoing it is apparent that it increases the flux threading the coil. When the field flux of the machine is suddenly reduced the electromotive force induced in the armature coil elements short circuited by the brushes causes a current flow therein that tends to resist the flux change by increasing the flux threading them, which is in the same direction as the current flow induced therein by the commutating pole. It will, therefore, be apparent that if it is desired to induce an electromotive force opposing the circulating current in the coil elements short circuited at the brushes induced by the reduction of the field flux that the flux for inducing this electromotive force in the coil elements should be such as to induce a current therein for decreasing the total flux threading the coils which is opposite to the flux produced by the commutating field winding.

This transient commutating flux is produced in my improved system by the use of the transient commutating field winding 22 which is connected across the field winding 17 through current limiting resistances 22ᵃ so that in ordinary operation of the system it carries a very small amount of current and does not substantially effect the operation of the machine. However, the rapid change in the rate of current flow to the field winding which is caused by the surge of current from the armature results in a substantial rise in voltage across the terminals of the exciting field winding 17 by self-induction and this voltage is applied across the transient commutating pole winding 22. The rise in voltage caused by self-induction of the exciting field winding is sufficient to cause a current flow through the commutating field winding 22 which produces a flux transverse to the flux produced by the exciting field winding 17 and opposes the compensating or commutating flux produced by winding 15. This momentary flux produced by the transient commutating field winding induces an electromotive force in the armature elements which are short circuited by the brushes during commutation opposing the electromotive force induced therein at the same time by the reduction of the field flux so that excessive sparking at the brushes during the transient in which the field flux is reduced does not occur.

In operation of the system shown in Fig. 1 the armature 10 is driven by any suitable means and supplies a load through lines 13 and 14. Assuming that the line 13 is positive, the current generated in the armature 10 will flow from the brush 12 and the inductance 16 to the line 13, and from the load through the line 14, commutating field winding 15 and brush 11 to the armature 10. The exciting field winding 17 will be energized by the exciter 18 which supplies current thereto through the under-current relay 21 and coil $16^a$. The transient commutating field winding 22 carries a very small amount of current because of the current limiting resistances $22^a$ through which it is connected across the terminals of the exciting field winding so that it will not substantially effect the operation of the machine under ordinary operating conditions. The flow of current in the various circuits of the system in ordinary operation is as above indicated, the main field flux being produced by the exciting field winding 17, and the compensating or commutating flux being produced by the winding 15. If under this condition a line short circuit should occur on the system substantially the entire generated voltage of the armature 10 will be applied to the circuit including the compensating winding 15 and the inductance 16 which will result in a sudden surge of current through these windings. This surge in current through the inductance 16 will induce a flow of current in the coil $16^a$ in the direction opposite to the ordinary flow therethrough caused by the exciter 18, that is, from the coil $16^a$ through the under-current relay 21 to the exciter 18. This opposition to the current flow from the exciter to the field winding will reduce the current flowing in the circuit to a very small amount so that the field flux produced by the exciting field winding 17 will be quickly diminished and at the same time the circuit from the exciter to the exciting field winding will be interrupted by the under-current relay 21. The sudden decrease in the excitation of the field winding 17 will cause a substantial rise in voltage across its terminals by self induction so that there will be a surge of current through the transient commutating field winding 22. This surge in current through the transient commutating pole winding will produce a flux which will induce an electromotive force in the armature winding elements short circuited by the brushes which opposes the electromotive force induced in these elements at the same time by the reduction of the field flux so that injurious sparking at the brushes during the transient in which the field flux is reduced will not occur.

It will thus be seen that the surge in the line current from the armature 10 which is occasioned by the short circuit reduces the current in the exciting field winding and thereby quickly reduces the voltage generated by the armature and prevents any overloading of the machine during the initial period of the short circuit, and that a transient commutating flux will be produced at the same time which will prevent excessive sparking at the brushes of the machine while the field flux is disappearing. Furthermore, if the short circuit continues the machine will not be damaged because the surge in reducing the current flowing through the exciting field winding 17 also opened the under-current relay 21 so that the exciter no longer energizes the field winding and substantially no voltage will be generated by the armature 10.

In the embodiment of my invention shown in Fig. 2 the system includes two direct current dynamo-electric machines which may be operated as generators or motors but which will be described as generators. These dynamo-electric machines include armatures 30 and 31 which are driven by any suitable means. The armature 30 is connected to the system through the brushes 32 and 33 and is provided with a compensating or commutating field winding 34. The armature 31 is also connected to the system through brushes 35 and 36 and is also provided with a compensating or commutating field winding 37. The field flux for the armature 30 is produced by an exciting field winding 38, and the field flux for the armature 31 is produced by an exciting field winding 39. The dynamo-electric machines of this system are protected against the line short circuit by quickly reducing their field flux when a line short circuit occurs. Rapid reduction of the field flux induces circulating currents in the armature coil elements short circuited during commutation by the brushes which results in excessive sparking at the brushes. In order to avoid this excessive sparking when the field flux is suddenly reduced a transient commutating field winding 40 is connected across the terminals of the exciting field winding 38 through current limiting resistances $40^a$, so that when the field flux is suddenly reduced the rise in voltage across the terminals of the exciting field winding by self induction will cause a surge in current through the commutating field winding. This surge in current through the transient commutating field winding produces a flux therein, opposing the flux produced by the compensating or commutating field winding, which induces an electromotive force in the armature winding elements short circuited during commutation by the brushes opposing the electromotive force induced therein at the same time by reduction of the field flux. The construction and operation of the transient commutating field winding 40 shown in Fig. 2 is substantially like the transient commutating field winding shown at 22 in Fig. 1 so that it is not considered necessary to explain in detail the reasons why the flux produced by the transient commutating pole 40 should oppose the usual compensating or commutating field flux, as this was fully explained in connection with Fig. 1. A transient commutating field winding 41 is connected through current limiting resistance 41ª across the exciting field winding 39 which produces the flux for the generator armature 31. The relation of this transient commutating field winding to the armature 21 is like that of the transient commutating field winding 38 relative to the armature 30 so that it produces the desired effect on commutation during the transient period in which the field flux is reduced. This winding, as in the case of the winding 40, does not effect the operation of the machine under ordinary conditions because of the current limiting resistances 41ª.

The armatures 30 and 31 with their respective compensating or commutating windings 34 and 37 are arranged in a series circuit between the lines 42 and 43 which includes a resistance 44. The exciting field windings 38 and 39 are energized by an exciter 45 which is driven from the shaft of armature 31 through the connection indicated by the dotted line at 45ª or in any other suitable manner, and both the exciter and the exciting field windings are arranged in parallel with the resistance 44 which is in the series circuit between lines 42 and 43. The circuit between the exciter 45 and the resistance 44 is controlled by an over-current relay switch 46 which is actuated by a coil 47 in the series circuit between the lines 42 and 43 so that in case of an excessive line current the relay switch 46 will be opened. The polarity and voltage of the exciter 45 relative to the armatures 30 and 31 is such that in ordinary operation of the system current flows from the armature 30 through the exciter 45 and then through the armature 31, there being a local circulation of current between the exciter 45 and the field windings 38 and 39. The resistance 44 is quite high so that it carries a very low current and it is proportioned so that the surge in the line circuit occurring in case of a short circuit thereon will give the desired rate of change in the flow of current in the circuits in parallel therewith.

The dynamo-electric machines shown are preferably mounted on a table 48 supported on suitable insulators 48ª and have their windings grounded to the table at 49, so that if the machines are arranged as part of a series of a high voltage system that the insulation of that portion of the system mounted on the table 48 will not be subjected to a greater potential than exists across the terminals of the machines mounted thereon.

In operation of the foregoing described system shown in Fig. 2 the armatures 30 and 31 are driven by any suitable means. Assuming for convenience that the line 42 is negative and that the line 43 is positive, the voltage generated by the armatures 30 and 31 will cause current to flow from the line 42 through compensating field winding 34, armature 30, exciter 45, armature 31 compensating field winding 37, over-current relay coil 47 to the line 43, substantially none of the line current flowing through the resistance 44. The exciter 45 will energize the exciting field windings 38 and 39 by supplying current through the exciting field winding 39 to the exciting field winding 38, the current flowing back to the exciter through the over-current relay switch 46. Current is generated in the armatures 30 and 31, the desired compensating or commutating flux being produced by the windings 34 and 37 and the field flux being produced by the exciting field windings 38 and 39. If the system should then be subjected to a short circuit across lines 42 and 43 there would be a rapid increase in the current flow from the armatures 30 and 31 through the over-current relay coil 47 to the line 43 causing the switch 46 to open the circuit between the exciter 45 and the resistance 44. As soon as the switch 46 is opened current will flow to some extent from the armature 30 through the resistance 44, which will be of high enough resistance to limit the current to the desired amount, and give the desired rate of change in current through the exciting field windings. The major portion of the current from the armature 30 will tend to flow through the exciting field winding 38, exciting field winding 39, armature 31, compensating field winding 37, and over-current relay coil 47 to the line 43. It will be noted that the tendency of the line current is to flow through the exciting field windings in the direction opposite to that flowing therethrough under the action of the exciter 45 so that there is a very rapid reduction in the exciting current flowing through the exciting field windings, and a consequent reduction of the field flux and the terminal voltage of the dynamo-electric machines, which prevents any damaging overloading of the machines by reason of the short circuit. The change in current flow through the exciting field windings will cause a substantial rise in voltage across their terminals by self-induction which will energize the transient commutating field windings 40 and 41. The transient commutating field windings will then produce a flux that induces an electromotive force in the elements of the armature short circuited by the brushes during commutation which opposes the electromotive force induced therein at the same time by the reduction of the field flux, so that excessive sparking at the brushes during the field flux change will not occur.

If the short circuit continues for an appreciable length of time the voltage generated in the armatures 30 and 31 will be so small that no damage will be caused to the system by the short circuit, as the short circuit current opened the exciter circuit and reversed the flow of current through the exciting field windings.

Whereas I have described my improved system of electrical distribution as including direct current generators, it is obvious that my invention is applicable as well for protecting through direct current dynamo-electric machines against line short circuits, and it is intended in the appended claims to cover all modifications which do not depart from the spirit and scope of my invention.

What I claim as new and desire to secure by Letters Patent of the United States, is:

1. In a direct current system of electrical distribution a dynamo-electric machine having an armature and an exciting field winding, said dynamo-electric machine being provided with a commutator and brushes, means for energizing said exciting field winding, means responsive to an increase in the current flow from said armature for decreasing the energization of said field winding in order to reduce the voltage generated by said armature, and means responsive to the decrease in energization of said field winding for inducing an electromotive force in that portion of said armature short circuited at the brushes during commutation opposing the electromotive force induced therein at the same time by the decrease in energization of said field winding.

2. In a direct current system of electrical distribution, a dynamo-electric machine having an armature and an exciting field winding said dynamo-electric mcahine being provided with a commutator and brushes, means for energizing said field winding, means responsive to an increase in the current flow from said armature for opening the circuit between said field energizing means and said exciting field winding in order to reduce the voltage generated by said armature, and means responsive to the decrease in energization of said exciting field winding for inducing an electromotive force in that portion of said armature short circuited at the brushes during commutation opposing the electromotive force induced therein at the same time by the decrease in energization of said exciting field winding accompanying the opening of the circuit between said exciter and said field winding.

3. In a direct current system of electrical distribution, a dynamo-electric machine having an armature and an exciting field winding, said dynamo-electric machine being provided with a commutator and brushes, means for energizing said exciting field winding, means responsive to an increase in the current flow from said armature for decreasing the energization of said field winding in order to reduce the voltage generated by said armature, and a transient commutating field winding including a current limiting resistance connected in parallel with said exciting field winding which is energized by the voltage induced in said exciting field winding by decreasing the energization thereof, said transient commutating field winding being arranged for creating a flux transversely of the field flux for inducing an electromotive force in that portion of said armature short circuited at the brushes during commutation opposing the electromotive force induced therein at the same time by the decrease in energization of said field winding.

4. In a direct current system of electrical distribution, a dynamo-electric machine having an armature and an exciting field winding, said dynamo-electric machine being provided with a commutator and brushes, means for energizing said field winding, means responsive to an increase in the current flow from said armature for opening the circuit between said energizing means and said exciting field winding in order to reduce the voltage generated by said armature, and a transient commutating field winding including a current limiting resistance connected in parallel with said exciting field winding which is energized by the voltage induced in said exciting field winding by decreasing the energization thereof, said transient commutating field winding being arranged to create a flux transversely of the field flux for inducing an electromotive force in that portion of said armature short circuited at the brushes during commutation opposing the electromotive force induced therein at the same time by the decrease in the energization of said field winding.

5. In a direct current system of electrical distribution, a dynamo-electric machine having an armature and an exciting field winding, said dynamo-electric machine being provided with a commutator and brushes, means for energizing said exciting field winding, a circuit connected to said armature including said exciting field winding and said field energizing means in parallel, said field energizing means preventing the current in the circuit from said armature flowing through said exciting field winding during ordinary operation of the system, means responsive to a short circuit on said system for opening the circuit between said field energizing means and said armature circuit so that the current in the circuit connected to said armature will flow through said exciting field winding in a direction opposite to the ordinary flow therethrough for reducing the energization of the field winding, and means energized by the change in energization of said field winding for inducing an electromotive force in that portion of said armature short circuited at the brushes during commutation opposing the electromotive force induced therein at the same time by decreasing the energization of said field winding.

6. In a direct current system of electrical distribution, a dynamo-electric machine having an armature and an exciting field winding, said dynamo-electric machine being provided with a commutator and brushes, means for energizing said exciting field winding, a circuit connected to said armature including a resistance in parallel with said exciting field winding and said field energizing means, said field energizing means preventing the current in the circuit connected to said armature flowing through said exciting field winding during ordinary operation of the system, and means responsive to a short circuit on said system for opening the circuit between said field energizing means and said armature circuit so that the current in the armature circuit will flow through said exciting field winding in a direction opposite to the direction of current flow therethrough caused by said energizing means for reducing the energization of said field winding, and means energized by the change in energization of said field winding for inducing an electromotive force in that portion of said armature short circuited by the brushes during commutation opposing the electromotive force induced therein at the same time by decreasing the energization of said field winding.

7. In a direct current system of electrical distribution, a plurality of dynamo-electric machines each being provided with an armature and an exciting field winding, means for energizing said exciting field windings, a series circuit including said armatures and a resistance, said exciting field windings and said energizing means being in parallel with said resistance, said field energizing means preventing the current in the circuit including said armatures flowing through said exciting field windings during ordinary operation of the system, and means responsive to a short circuit on said system for opening the circuit between said field energizing means and said series circuit so that the current in said series circuit will flow through said exciting field windings in a direction opposite to the ordinary flow of current therethrough caused by said energizing means so that field flux and the terminal voltage of the dynamo-electric machines will be quickly reduced upon the occurrence of a short circuit on said system.

8. In a direct current system of electrical distribution, a plurality of dynamo-electric machines each being provided with an armature and an exciting field winding, each of said dynamo-electric machines also being provided with a commutator and brushes, means for energizing said exciting field windings, a series circuit including said armatures and a resistance element, said exciting field windings and said energizing means being in parallel with said resistance, said field energizing means preventing the current in said series circuit including said armatures flowing through said exciting field windings during ordinary operation of the system, and means responsive to a short circuit on said system for opening the circuit between the field energizing means and said series circuit so that the current in said series circuit will flow through said exciting field windings in a direction opposite to the direction of flow therethrough caused by said energizing means for decreasing the energization of said field windings, and means energized by the change in energization on said exciting field windings for inducing an electromotive force in the portions of said armatures short circuited by the brushes during commutation opposing the electromotive force induced therein at the same time by the decrease in the energization of said field windings.

In witness whereof I have hereunto set my hand this 12th day of May, 1927.

ERNST F. W. ALEXANDERSON.